(12) United States Patent
Morizumi et al.

(10) Patent No.: US 6,614,736 B2
(45) Date of Patent: Sep. 2, 2003

(54) OPTICAL DISC DRIVE, AND RECORDING/ REPRODUCING METHOD

(75) Inventors: Toshio Morizumi, Kanagawa (JP); Michihiko Iida, Kanagawa (JP); Kunihiko Miyake, Kanagawa (JP)

(73) Assignee: Sony Corporation, Tokyo (JP)

( * ) Notice: Subject to any disclaimer, the term of this patent is extended or adjusted under 35 U.S.C. 154(b) by 119 days.

(21) Appl. No.: 09/834,811

(22) Filed: Apr. 13, 2001

(65) Prior Publication Data

US 2001/0030922 A1 Oct. 18, 2001

(30) Foreign Application Priority Data

Apr. 14, 2000 (JP) .................................... P2000-118512

(51) Int. Cl.[7] ................................................ G11B 7/00
(52) U.S. Cl. .................. 369/53.1; 369/53.45; 369/47.1; 369/59.14
(58) Field of Search ............................ 369/47.1, 47.11, 369/47.15, 47.22, 47.32, 47.39, 47.51, 53.1, 53.2, 53.41, 59.1, 59.14

(56) References Cited

U.S. PATENT DOCUMENTS 5,859,822 A * 1/1999 Inoue et al. ............. 369/53.22
6,141,307 A * 10/2000 Yoshioka .................. 369/53.22
6,144,625 A * 11/2000 Kuroda et al. ........... 369/44.27
6,411,577 B1 * 6/2002 Hirose ..................... 369/53.22

FOREIGN PATENT DOCUMENTS

| EP | 0 910 079 | 4/1999 |
| EP | 0 987 697 | 3/2000 |
| JP | 04 259918 | 9/1992 |
| JP | 2000 030353 | 1/2000 |

* cited by examiner

Primary Examiner—Muhammad Edun
(74) Attorney, Agent, or Firm—Frommer Lawrence & Haug LLP; William S. Frommer

(57) ABSTRACT

To enable a plurality of types of optical discs different in recording density from each other and quickly getting "ready" for writing and/or reading data to and/or from each of such optical discs, various controlling conditions requisite for the data writing and reading operations are stored in a memory for both optical discs having first and second recording densities, respectively. For a shorter time up to a "ready" state for data write or read, a controller makes an instant discrimination, based on the pattern of a sync signal "SYNC" included in an ATIP wobble signal supplied from an ATIP decoder, between the optical disc having the first recording density and that having the second recording density, reads, from the memory, controlling conditions corresponding to the result of the disc type discrimination, and sets operating parameters for each component of the optical disc drive.

21 Claims, 6 Drawing Sheets

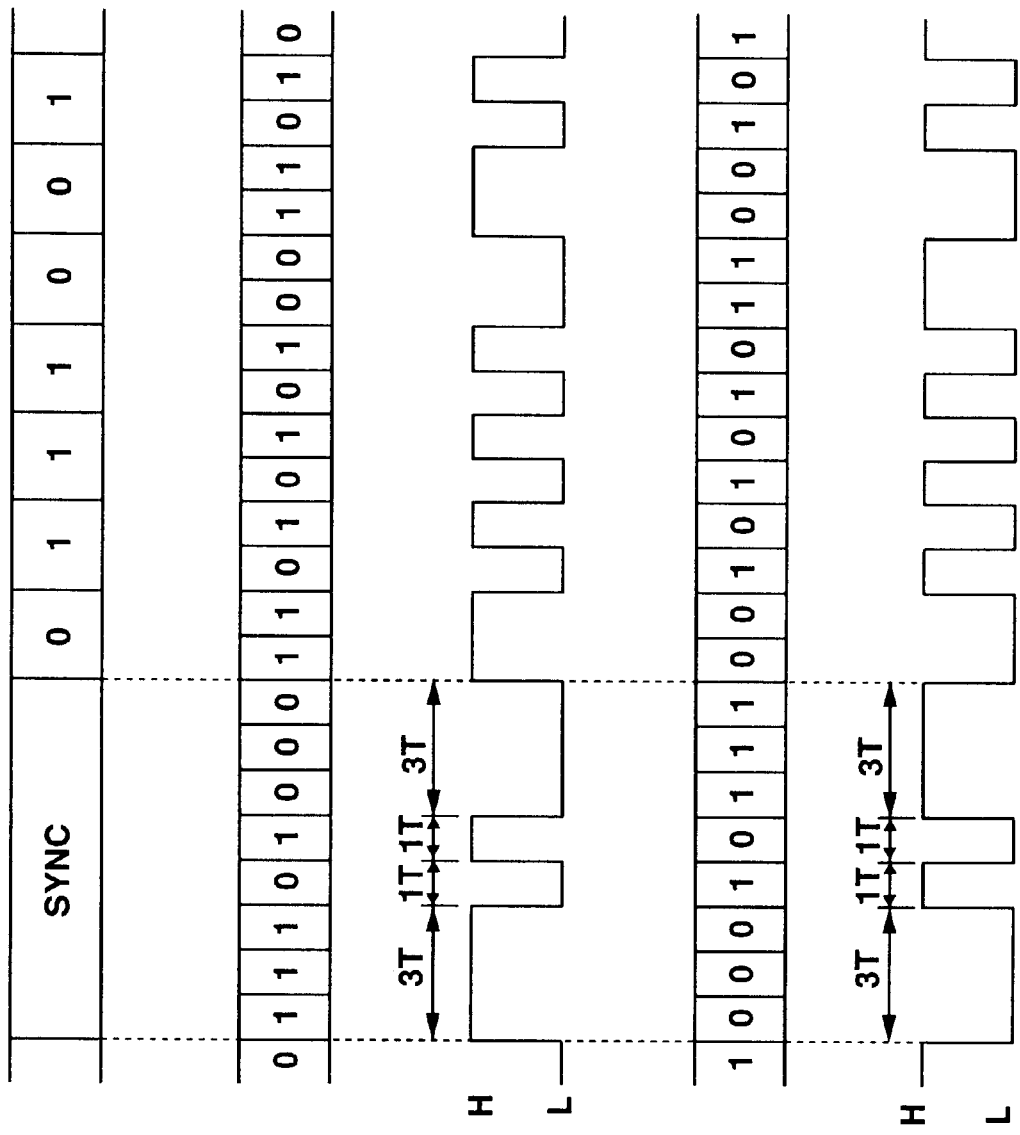

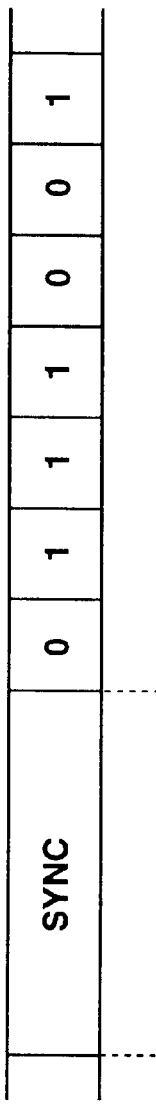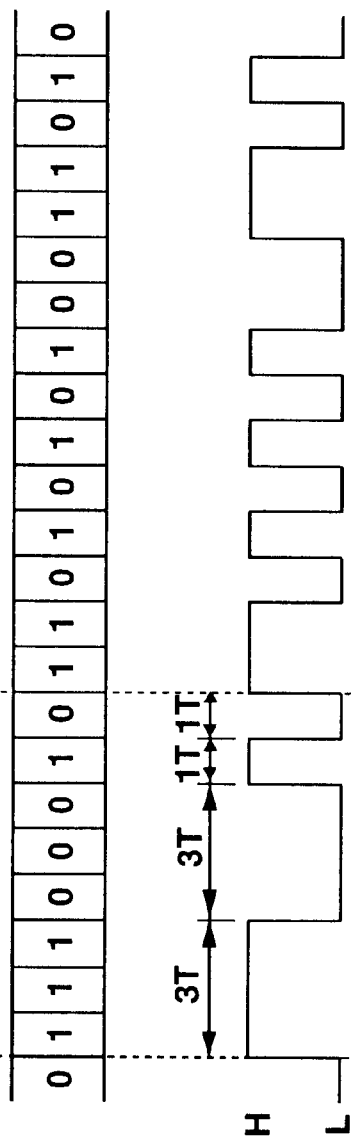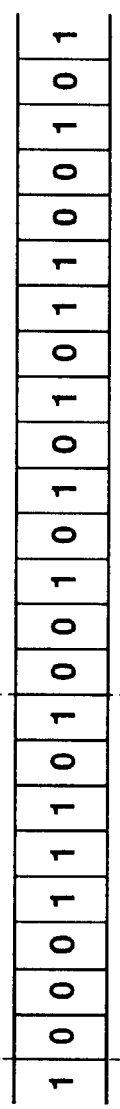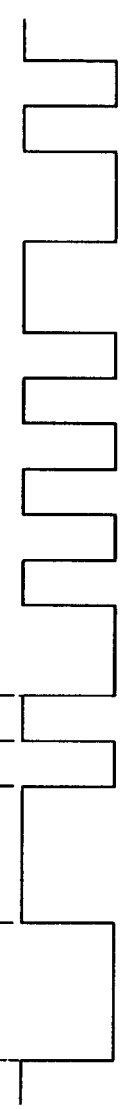
FIG.6A  FIG.6B  FIG.6C  FIG.6D  FIG.6E

|  | NORMAL-DENSITY CD-RW | DOUBLE-DENSITY CD-RW |
|---|---|---|
| OPTIMUM WRITING POWER | 22 mW | 18 mW |
| OPTIMUM ERASING POWER | 12 mW | 10 mW |
| OPTIMUM READING POWER | 1 mW | 0.8 mW |

FIG.8

OPTICAL DISC DRIVE, AND RECORDING/REPRODUCING METHOD

BACKGROUND OF THE INVENTION

1. Field of the Invention

The present invention relates to an optical disc drive, and data recording/reproducing method, which writes and/or reads data to and/or from an optical disc, and more particularly, to an optical disc drive, and data recording and/or reproducing method, which enable a plurality of types of optical discs different in recording density from each other.

2. Description of the Related Art

There have become popular the CD (compact disc) systems in which an optical disc having an outside diameter of about 120 mm and a thickness of about 1.2 mm is used as a recording medium and a signal is read from, or written to, the optical disc by illuminating a signal recording surface of the optical disc with a light converged by an objective lens.

The CD system has initially been developed as a recording/playback system for digital audio data. As this technology has been accepted very widely, a wide variety of CD systems have so far been proposed for various applications.

Recently, the personal computers have been used as an information processing means in more and more ordinary households. Along with this tendency, a read-only optical disc called "CD-ROM (read-only memory)" has become popular for use to record data handled in the personal computer.

Also, a recordable optical disc such as CD-R (recordable) and rewritable optical disc such as CD-RW (rewritable) have been developed and used as optical discs interchangeable with the CD-ROM in practice.

The amount of data handled in the personal computer has become larger and larger, and thus the CD-ROM, CD-R and CD-RW as recording media for recording data have strongly been required to have an increased storage capacity.

To meet such a requirement, the so-called double-density CD-R and CD-RW maintaining the CD format and having a recording density about 2 times higher than in the current CD format are under development.

In the double-density CD-R and CD-RW, the EFM (eight-to-fourteen modulation) modulation and demodulation methods and error correction method applied to the CD-R and CD-RW having the current format (will be referred to as "normal-density CD-R" and "normal-density CD-RW", respectively, hereunder) are not changed but the track pitch is reduced while the linear density is increased, to thereby elevate the recording density up to about double that of the currently available normal-density CD-R and CD-RW. Thus, it has been tried to attain a higher recording density without having to considerably modify the circuit design while maintaining the compatibility with the normal-density CD-R and CD-RW.

Along with the development of such double-density CD-R and CD-RW, there has been developed an optical disc drive which is compatible with the double-density CD-R and CD-RW. It should be reminded that the present invention will be described hereunder taking the CD-R and CD-RW as recording media and an apparatus supporting these CD-R and CD-RW as an optical disc drive.

For an optical disc drive capable of a double-density CD-R or CD-RW, it is desired that data can properly be written to, and/or read from, the normal-density CD-R or CD-RW, an instant discrimination of an optical disc to or from which data is going to be written or read can be made among a double-density CD-R, double-density CD-RW, normal-density CD-R and a normal-density CD-RW, and various parameters necessary for data writing and reading operations can instantly be selected and the time taken for the optical disc drive to get "ready" for data write or read is as short as possible.

OBJECT AND SUMMARY OF THE INVENTION

It is therefore an object of the present invention to overcome the above-mentioned drawbacks of the prior art by providing an optical disc drive, and a data recording/reproducing method, which enable a plurality of types of optical discs different in recording density from each other and also can start data write and/or read to and/or from each of the optical discs in a short time.

The above object can be attained by providing an optical disc drive capable of a plurality of types of optical discs different in recording density from each other, the apparatus including according to the present invention:

means for writing and/or reading data to and/or from each of the plurality of types of optical discs;

means for having stored therein, for each of the plurality of types of optical discs, controlling conditions under which the data writing/reading means writes and/or reads data to and/or from each of the plurality of types of optical discs; and a disc discriminating means for determining the recording density of an optical disc to and/or from which the data writing/reading means is going to write and/or read data.

In the above optical disc, the data writing/reading means acquires, from the storing means, controlling conditions corresponding to the recording density of the optical disc, determined by the disc discriminating means, and writes and/or reads data to and/or from the optical disc under the acquired controlling conditions.

Also the above object can be attained by providing a data recording/reproducing method for writing and/or reading data to and/or from a plurality of types of optical discs different in recording density from each other, the method including according to the present invention, steps of:

emitting a light beam to the optical disc and detecting a reflected light from the optical disc;

determining the type of the optical disc based on the result of the above reflected light detection; and selecting data write and/or read controlling conditions, stored for each of the plurality of types of optical discs in a memory, based on the result of the disc type discrimination; and writing and/or reading data to and/or from the optical disc under the selected controlling conditions.

In the above data recording/reproducing method, controlling conditions corresponding to the type (recording density) of the optical disc, determined at the disc type discriminating step, are acquired from the memory, and data is written and/or read to and/or from the optical disc under the acquired controlling conditions.

These objects and other objects, features and advantages of the present intention will become more apparent from the following detailed description of the preferred embodiments of the present invention when taken in conjunction with the accompanying drawings.

BRIEF DESCRIPTION OF THE DRAWINGS

FIG. 2 shows a layout of the recording area of the CD-RW in FIG. 1, in which:

FIG. 5 shows in detail an example of a pattern of a sync signal "SYNC" included in an ATIP wobble signal from the normal-density CD-RW, in which:

FIG. 5A shows the ATIP wobble signal;

FIG. 5B shows a channel bit pattern which would be when a preceding channel bit is "0";

FIG. 5C shows a bi-phase signal corresponding to the channel bit pattern in FIG. 5B;

FIG. 5D shows a channel bit pattern which would be when the preceding channel bit is "1"; and FIG. 5E shows a bi-phase signal corresponding to the channel bit pattern in FIG. 5D;

FIG. 6 shows in detail an example of the sync signal "SYNC" included in an ATIP wobble signal from the double-density CD-RW, in which:

FIG. 6A shows the ATIP wobble signal;

FIG. 6B shows a channel bit pattern which would be when a preceding channel bit is "0";

FIG. 6C shows a bi-phase signal corresponding to the channel bit pattern in FIG. 6B;

FIG. 6D shows a channel bit pattern which would be when the preceding channel bit is "1"; and FIG. 6E shows a bi-phase signal corresponding to the channel bit pattern in FIG. 6D;

FIG. 8 shows an example of controlling conditions stored in EEPROM provided in the optical disc drive in FIG. 7.

DETAILED DESCRIPTION OF THE PREFERRED EMBODIMENTS

The optical disc drive according to the present invention is adapted to properly write and/or read data to and/or from an optical disc designed to have a high recording density and also properly write and/or read data to an optical disc having the current format. Note that although the present invention will be described hereunder concerning an optical disc drive which writes and/or reads data to and/or from a CD-RW (rewritable optical disc), the present invention is not limited to this type of optical disc but the optical disc drive according to the present invention can effectively support all types of optical discs such as an optical disc drive capable of for example a CD-R (recordable optical disc), CD-ROM (read-only optical disc), etc.

Prior to starting the detailed description of the optical disc drive according to the present invention, a CD-RW having the current format (will be referred to as "normal-density CD-RW" hereunder) and a newly defined double-density CD-RW, to and/or from which the optical disc drive can write and/or read data, will briefly be described herebelow. Note that in the following description, these two types of CD-RW will generically be referred to simply as "CD-RW" with no discrimination between them wherever common matters to both the normal—and double-density CD-RWs are described.

Figure 1:
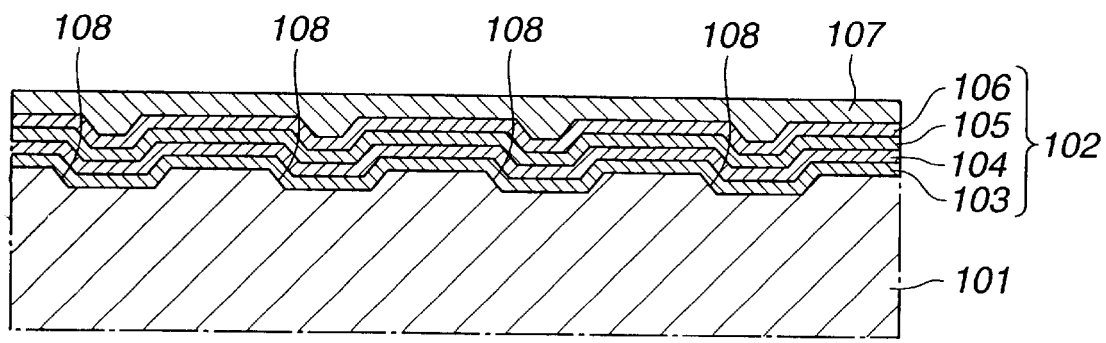
FIG. 1 is a sectional view of the essential portions of a CD-RW.

Referring now to FIG. 1, there is schematically illustrated in the form of a sectional view a CD-RW to and/or from which data is written and/or read by the optical disc drive according to the present invention. As shown, the CD-RW includes a disc substrate 101 being a disc of polymethyl methacrylate (PMMA) or polycarbonate (PC), formed to have an outside diameter of 120 mm and thickness of 1.2 mm. The disc substrate 101 has a recording layer 102 formed thereon.

The recording layer 102 has formed on the disc substrate 101 a first transparent dielectric layer 103 of $ZnS-SiO_2$ or the like, a phase-change recording layer 104 of GeSbTe or the like, a second transparent dielectric layer 105 of $ZnS-SiO_2$ or the like, and a reflective layer 106 of Al or the like. Also, the recording layer 102 has a protective layer 107 formed thereon by spin coating of an ultraviolet-settable resin or the like.

In this CD-RW, when the recording layer 102 is illuminated with a writing laser light having been modulated according to data to be written (recording data) from the disc substrate side 101, a recording mark corresponding to the recording data will be recorded as a phase change of the phase-change recording layer 104 of the recording layer 102. The recording mark is illuminated with a reading laser light and a change of its reflectance is detected, to thereby read data from the CD-RW.

Figure 2A:
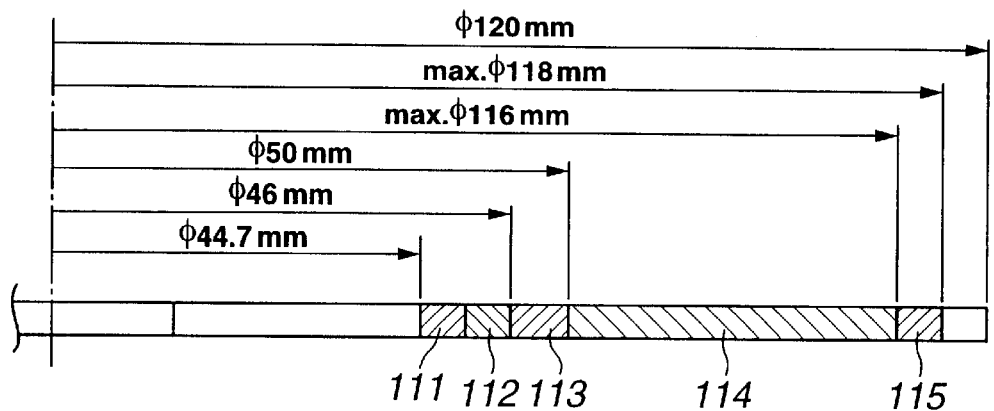
FIG. 2A shows a layout of the recording area of a normal-density CD-RW.
Figure 2B:
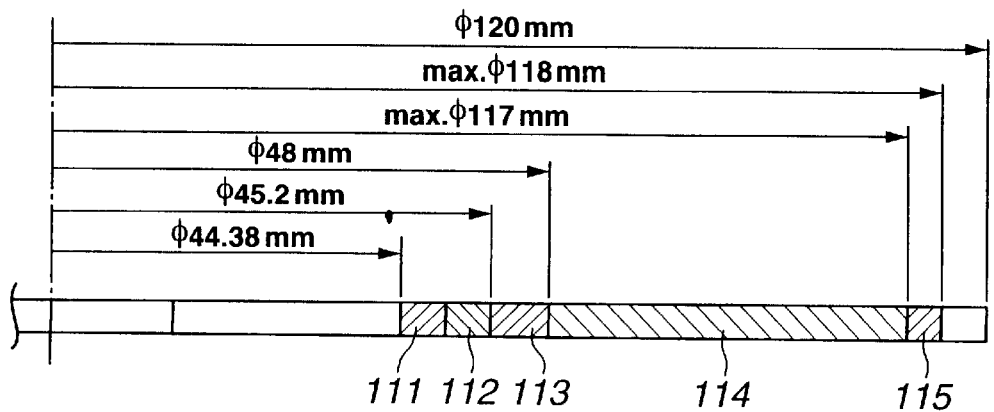
FIG. 2B shows a layout of the recording area of a double-density CD-RW.

FIGS. 2A and 2B show an example of the layout of the recording area of the CD-RW. As shown in FIGS. 2A and 2B, the data recording area of the CD-RW includes a power calibration area (PCA) 111, program memory area (PMA) 112, lead-in area 113, program area 114 and a lead-out area 115.

In the PCA area 111, the writing laser power is calibrated. This area further includes a test area in which a trial write is actually made, and a count area in which the used status of the test area is recorded. In the PMA area 112, information such as a recording data mode, write start and write end positions, etc. are provisionally stored for each track. These PCA and PMA areas 111 and 112 are only needed only at the time of data recording. After completion of the finalization to end a data write to the lead-in area 113 and lead-out area 115, the optical pickup will not access these areas during data reading.

The lead-in area 113 is used to read data written in the program area 114, and will have TOC (table of contents) information or the like written therein. At the time of data reading, the optical pickup can access a desired track instantly by reading the TOC information written in the lead-in area 113.

The program area 114 is an area to which recording data is actually written and has a maximum of 99 logical tracks set therein.

The lead-out area 115 will have a variety of information on the optical disc recorded therein. The lead-out area 115 also works as a buffering area to prevent the optical pickup of the optical disc drive from overrunning.

In the normal-density CD-RW, the lead-in area 113 is defined between diameters of 46 mm and 50 mm, the program area 114 is defined between diameters of 50 mm and 116 mm at the maximum, and the lead-out area 115 is defined between diameters of 116 mm and 118 mm at the maximum, as shown in FIG. 2A. The PCA area 111 and PMA area 112 are provided inside the inner circumference of the lead-in area 113. Note that the innermost circumference of the PCA area 111 is at a diameter of 44.7 mm.

On the other hand, in the double-density CD-RW, the lead-in area 113 is defined between diameters of 45.2 mm and 48 mm, the program area 114 is defined between diameters of 48 mm and 117 mm at the maximum, and the lead-out area 115 is defined between diameters of 117 mm and 118 mm at the maximum, as shown in FIG. 2B. The PCA area 111 and PMA area 112 are provided inside the inner circumference of the lead-in area 1 13, and the innermost circumference of the PCA area 111 is at a diameter of 44.38 mm.

The aforementioned layout of the double-density CD-RW aims at extending the program area 114 to the maximum while maintaining the compatibility with the normal-density CD-RW. That is, the double-density CD-RW has an increased recording density by increasing only the recording density as well as by extending the program area 114 in which recording data is actually written in a range in which the compatibility with the normal-density CD-RW can be maintained.

Figure 3:
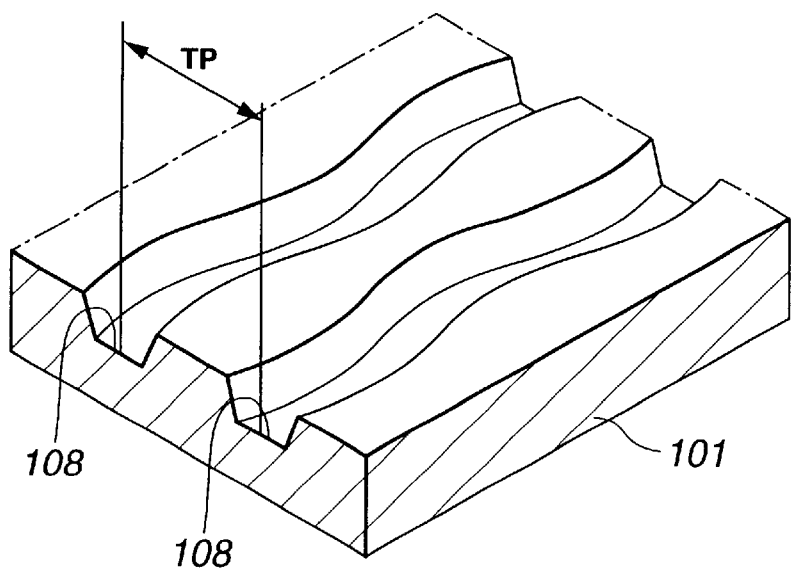
FIG. 3 is a perspective view, partially enlarged in scale, of the CD-RW in FIG. 1.

As shown in FIGS. 1 and 3, the CD-RW has formed on the disc substrate 101 thereof wobbling grooves 108 which are for example spirally wobbled guide walls. A part of the recording area 102 corresponding to the wobbling grooves 108 is defined as a recording track along which EFM-modulated signal (EFM signal) will be recorded. More specifically, in the CD-RW, the interval between adjacent wobbling grooves 108 is a track pitch TP, as shown in FIG. 3. In the normal-density CD-RW, the track pitch TP is set to about 1.6 μm, while in the double-density CD-RW, the track pitch TP is set to about 1.1 μm. The double-density CD-RW has an increased recording density by making the track pitch TP smaller than that in the normal-density CD-RW in this way.

Also in the double-density CD-RW, the track pitch TP is reduced while the recording density (linear density) along the recording track is increased. More specifically, the shortest pitch length (3T) in the normal-density CD-RW is about 0.83 μm while that (3T) in the double-density CD-RW is about 0.62 μm.

By reducing the track pitch TP while increasing the linear density as in the above, the double-density CD-RW has a recording density about 2 times higher than that of the normal-density CD-RW and thus can record data in an amount about double the capacity of the normal-density CD-RW, more specifically, more than 1 GB of data.

The wobbling grooves 108 are formed to slightly meander (wobble) sinusoidally. FM-modulated data, that is, time-base data indicative of an absolute position on the optical disc, is recorded as an ATIP (absolute time in pregroove) wobble signal by this wobbling.

The ATIP wobble signal is recorded for the center frequency thereof to be 22.05 kHz when the CD-RW is driven to rotate at a predetermined velocity. One sector of the ATIP wobble signal coincides with one data sector (2352 bytes) of a recording signal. The recording signal will be written with the data sector of the recording data being synchronized with the sector of the ATIP wobble signal.

Figure 4:
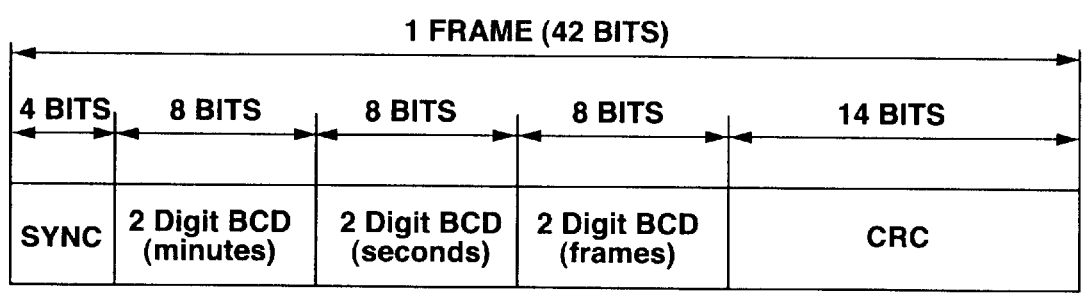
FIG. 4 shows a frame structure of an ATIP wobble signal.

The frame structure of the ATIP wobble signal is shown in FIG. 4. As shown, one frame of the ATIP wobble signal is of 42 bits of which the first 4 bits are a sync signal "SYNC". The frame further includes time-base data "minutes", "seconds" and "frames" each notated in 2-digit BCD (8 bits), and 14 bits of CRC (cyclic redundancy code). The pattern of the sync signal "SYNC" in the ATIP wobble signal from the normal-density CD-RW is made different from that of the sync signal "SYNC" in the ATIP wobble signal from the double-density CD-RW.

An example of the pattern of the sync signal "SYNC" in the ATIP wobble signal from the normal-density CD-RW is shown in detail in FIGS. 5A to 5E.

The ATIP wobble signal shown in FIG. 5A takes a channel bit pattern as shown in FIG. 5B or 5D after being subjected to bi-phase mark modulation. The sync signal "SYNC" in the ATIP wobble signal takes a channel bit pattern "1101000" as shown in FIG. 5B when a preceding channel bit is "0", and the bi-phase signal after being subjected to the bi-phase mark modulation has a waveform as shown in FIG. 5C. The sync signal "SYNC" in the ATIP wobble signal takes a channel bit pattern "00010111"as shown in FIG. 5D when the preceding channel bit is "1", and the bi-phase signal after being subjected to the bi-phase mark modulation has a waveform as shown in FIG. 5E. That is, in the pattern of the sync signal "SYNC" in the ATIP wobble signal from the normal-density CD-RW, a wave of 3T having one polarity and a wave of 3T having an opposite polarity are connected to each other by a wave of 1T between them.

An example of the pattern of the sync signal "SYNC" in the ATIP wobble signal from the double-density CD-RW is shown in detail in FIGS. 6A to 6E.

The ATIP wobble signal shown in FIG. 6A takes a channel bit pattern as shown in FIG. 6B or 6D after being subjected to bi-phase mark modulation. The sync signal "SYNC" in the ATIP wobble signal takes a channel bit pattern "11100010" as shown in FIG. 6B when a preceding channel bit is "0", and the bi-phase signal after being subjected to the bi-phase mark modulation has a waveform as shown in FIG. 6C. The sync signal "SYNC" in the ATIP wobble signal takes a channel bit pattern "00011101" as shown in FIG. 6D when the preceding channel bit is "1", and the bi-phase signal after being subjected to the bi-phase mark modulation has a waveform as shown in FIG. 6E. That is, in the pattern of the sync signal "SYNC" in the ATIP wobble signal from the double-density CD-RW, a wave of 3T having one polarity and a wave of 3T having an opposite polarity are contiguous to each other.

Since the pattern of the sync signal "SYNC" in the ATIP wobble signal from the normal-density CD-RW is made different from that of the sync signal "SYNC" in the ATIP wobble signal from the double-density CD-RW, so the optical disc drive will be able to instantly judge whether the CD-RW set in place therein is a normal-density CD-RW or double-density CD-RW when detecting the ATIP wobble signal and reading the sync signal in the ATIP wobble signal.

Next, the optical disc drive according to the present invention, adapted to write and/or read data to and/from the aforementioned normal—and double-density CD-RWs, will be described herebelow.

Figure 7:
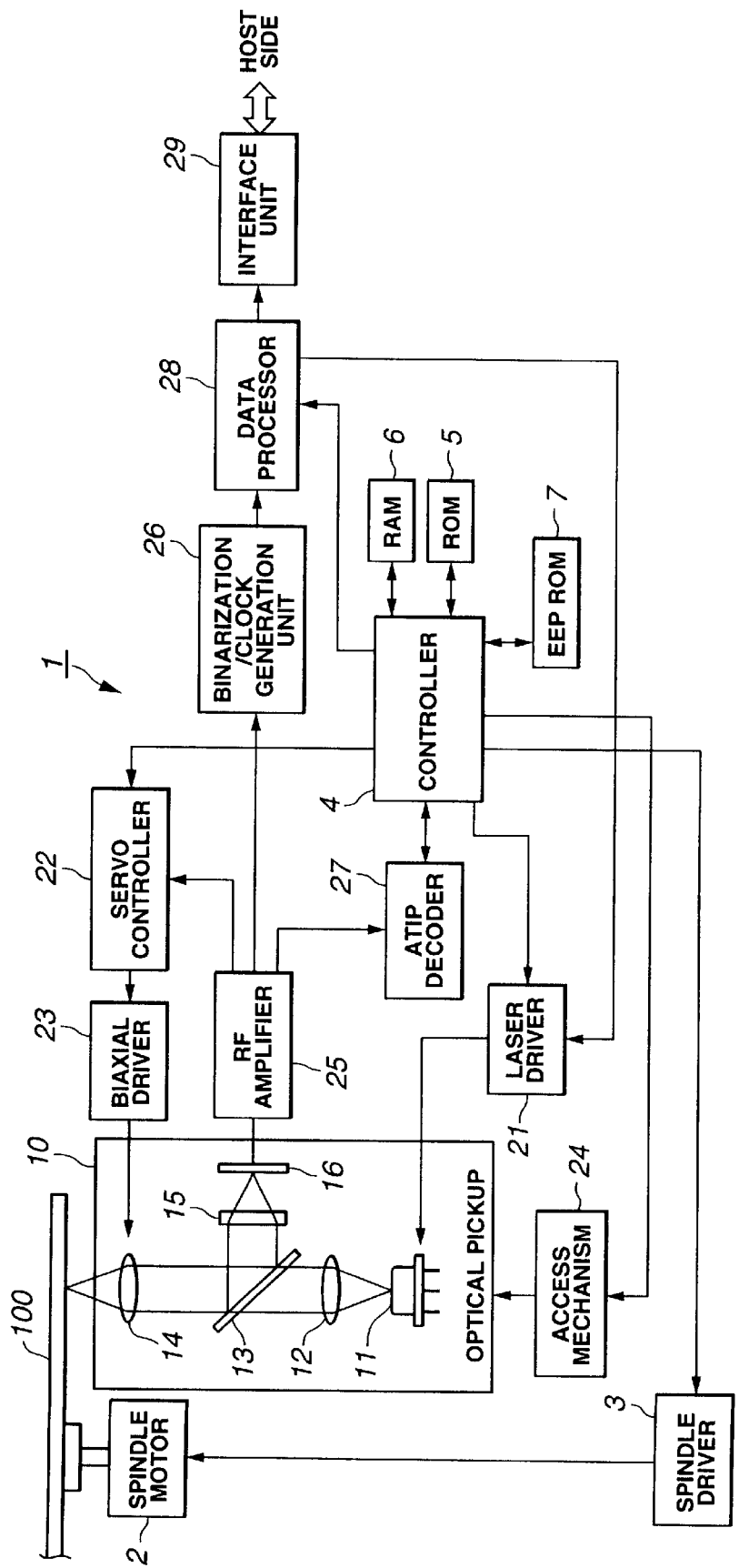
FIG. 7 is a block diagram of the optical disc drive according to the present invention, showing an example of its construction.

Referring now to FIG. 7, there is illustrated in the form of a block diagram an example construction of the optical disc drive according to the present invention. The optical disc drive is generally indicated with a reference 1. As shown in FIG. 7, the optical disc drive 1 includes a spindle motor 2 on which a CD-RW 100 as a recording medium (normal-density CD-RW or double-density CD-RW) is to be mounted.

The spindle motor 2 is driven by a spindle driver 3. When the spindle motor 2 is driven by the spindle driver 3, the normal-density CD-RW, if fitted, is rotated at a constant linear velocity of about 1.2 m/sec (standard velocity), or the double-density CD-RW is rotated at a CLV of about 0.9 m/sec (standard velocity). Note that the spindle driver 3 is controlled by a controller 4.

The optical disc drive 1 includes an optical pickup 10 which emits a converged light beam to the CD-RW 100 rotated by the spindle motor 2 and detects a return light from the CD-RW 100. As shown in FIG. 7, the optical pickup 10 includes a semiconductor laser 11 which emits a light beam of about 780 nm in wavelength, a collimator lens 12 which changes the light beam emitted from the semiconductor laser 11 to a parallel beam, a beam splitter 13 which splits the optical path of the light beam, an objective lens 14 which focuses the light having passed through the beam splitter 13 and directs it to the CD-RW 100, a condenser lens 15 which converges a return light reflected from the CD-RW 100 and also by the beam splitter 13, and a photodetector 16 which detects the return light condensed by the condenser lens 15.

The semiconductor laser 11 of the optical pickup 10 is driven by a laser driver 21. When driven by the laser driver 21, the semiconductor laser 11 emits a light beam having a predetermined writing power when writing data to the CD-RW 100, a light beam having a predetermined reading power when reading data from the CD-RW 100, and a light beam having a predetermined erasing power when erasing data written in the CD-RW 100. Note that the laser driver 21 operates under the control of the controller 4.

The object lens 14 of the optical pickup 10 is supported by a bi-axial actuator (not shown) movably bi-axially, that is, radially of, and towards and away from, the CD-RW 100 set on the spindle motor 2. The bi-axial actuator is driven by a bi-axial driver 23 which operates under the control of a servo controller 22. As the bi-axial driver 23 drives the bi-axial actuator which moves the objective lens 14 bi-axially, the optical pickup 10 are servo-controlled for focusing and tracking. Note that the servo controller 22 operates under the control of the controller 4.

Also the optical pickup 10 is moved radially of the CD-RW 100 set on the spindle motor 2 by an access mechanism 24 which operates under the control of the controller 4. As the optical pickup 10 is moved radially of the CD-RW 100 by the access mechanism 24, it can access a desired recording track on the CD-RW 100.

Output of the photodetector 16 of the optical pickup 10 is supplied to an RF amplifier 25. The RF amplifier 25 generates, according to a voltage signal supplied from the photodetector 16, a reading signal (RF signal), focus error signal, tracking error signal, wobble signal, etc. The reading signal generated by the RF amplifier 25 is supplied to a binarization/clock generation unit 26, the focus and tracking error signals are supplied to the servo controller 22, and the wobble signal is supplied to an ATIP wobble decoder 27.

The binarization/clock generation unit 26 binarizes the reading signal supplied from the RF amplifier 25 to digital data, and supplies the digital data to a data processor 28. The binarization/clock generation circuit 26 also generates a clock signal synchronous with the digital data, and supplies the clock signal along with the digital data to the data processor 28.

The data processor 28 makes, under the control of the controller 4, EFM modulation, de-interleaving and error correction by CIRC (cross interleave Reed-Solomon code) of the digital data supplied from the binarization/clock generation unit 35. Further, the data processor 28 makes descrambling and error correction by ECC (error correcting code) of the digital data.

The data having been subjected to the error correction in the data processor 28 is stored in a buffer memory such as RAM, and then supplied as reading data to a computer or the like at the host side via an interface unit 29.

When supplied with a recording data from the computer or the like at the host side via the interface unit 29, the data processor 28 provisionally stores it in the buffer memory such as RAM, reads out the recording data from the buffer memory, encodes it to a predetermined sector format, and appends an error correction ECC to the recording data. Further, the data processor 28 further makes CIRC encoding and EFM modulation of the recording data to generate a recording signal. Then, the recording signal is supplied to the laser driver 21.

An ATIP decoder 27 is provided to demodulate the wobble signal supplied from the RF amplifier 25 under the control of the controller 4, and thus generate an ATIP wobble signal indicative of time-base data. The ATIP wobble signal generated by the ATIP decoder 27 is supplied to the controller 4. For access of the optical pickup 10 to a desired recording track, the controller 4 controls the access mechanism 24 according to the ATIP wobble signal to allow the optical pickup 10 to access the recording track.

The controller 4 controls the operation of the whole optical disc drive 1, and controls the operation of each component of the optical disc drive 1 using a RAM 6 as a work area and according to an operation controlling program stored in a ROM 5.

Also, the controller 4 has an EEPROM 7 connected thereto. The EEPROM 7 has stored therein various controlling conditions requisite for data write and/or read to and/or from the normal-density CD-RW and various controlling conditions requisite for writing and/or reading data to and/or from the double-density CD-RW.

More particularly, the controlling conditions stored in the EEPROM 7 include, as shown in FIG. 8, set values of light emitting power of the semiconductor laser 1 of the optical pickup 10, namely, set values of optimum powers for data write, erasure and read with respect to the normal-density CD-RW, and set values of optimum powers for data write, erasure and read with respect to the double-density CD-RW. Further, the EEPROM 7 has stored therein optimum offset and gain values for focus servo control of the optical pickup 10 and optimum offset ad gain values for tracking servo control of the optical pickup 10 for both data write and/or read to and/or from the normal-density CD-RW and those to and/or from the double-density CD-RW, respectively.

When the CD-RW 100 is set on the spindle motor 2 and the optical disc drive 1 is put into operation, the controller 4 first judges the CD-RW 100 set on the spindle motor 2 to be a normal-density CD-RW or a double-density CD-RW. This disc discrimination is effected based on for example the pattern of a sync signal "SYNC" included in an ATIP wobble signal detected from the CD-RW 100 set on the spindle motor 2. More specifically, the controller 4 is supplied with the ATIP wobble signal detected from the CD-RW 100 set on the spindle motor 2, from the ATIP decoder 27. The pattern of the sync signal "SYNC" in the ATIP wobble signal supplied from the ATIP decoder 27 is different between the ATIP wobble signal detected from the normal-density CD-RW and that detected from the double-density CD-RW as having previously been described. Therefore, the controller 4 can instantly judge the CD-RW 100 set on the spindle motor 2 to be a normal-density CD-RW or a double-density CD-RW by reading the pattern of the sync signal "SYNC" in the ATIP wobble signal supplied from the ATIP decoder 27.

Next to the judgment of the CD-RW 100 mounted on the spindle motor 2 to be a normal-density CD-RW or a double-density CD-RW, the controller 4 will read the various controlling conditions corresponding to the CD-RW 100 from the EEPROM 7, and set, under the various controlling conditions, an operation parameter for each of the components of the optical disc drive 1.

In the optical disc drive 1, when writing and/or reading data to the CD-RW 100, the controller 4 instantly judges the CD-RW 100 to be a normal-density CD-RW or a double-density CD-RW, reads corresponding controlling conditions from the EEPROM 7, and sets an operation parameter for each component of the optical disc drive 1 under the controlling conditions. Thus, the time up to a "ready" state for data write and/or read can be shortened very much for both the normal-density CD-RW and double-density CD-RW.

Further, in the optical disc drive 1 according to the present invention, various controlling conditions requisite for data write and/or read to and/or from the normal-density CD-RW and those requisite for data write and/or read to and/or from the double-density CD-RW are stored in the EEPROM 7, and when data is written and/or read to and/or from the normal-density CD-RW or double-density CD-RW, corresponding controlling conditions are read from the EEPROM 7 to set an operation parameter for each component of the optical disc drive 1. Thus, the data write and/or read can properly be done to and/or from both the normal-density and double-density CD-RWs.

The data write to the CD-RW 100 by the optical disc drive 1 according to the present invention will be described herebelow. For writing data to the CD-RW 100, the optical disc drive 1 is first put into the "ready" state in which data can be written to the CD-RW 100 as will be described below:

That is, the CD-RW 100 is first set on the spindle motor 2. The spindle driver 3 drives the spindle motor 2 under the control of the controller 4 to rotate the CD-RW 100. Also under the control of the controller 4, the laser driver 21 drives the semiconductor laser 11 of the optical pickup 10 to emit a light beam having a predetermined power.

The light beam emitted from the semiconductor laser 11 is changed by the collimator lens 12 to a parallel beam. The parallel beam is passed through the beam splitter 13, then focused by the objective lens 14 onto the CD-RW 100 being rotated by the spindle motor 2. The incident light beam upon the CD-RW 100 is reflected by the latter to provide a return light. The return light contains signal components from the wobbling grooves 108 formed on the CD-RW 100.

The return light containing the signal components from the wobbling grooves 108 is passed through the objective lens 14 and reflected by the beam splitter 13, is converged by the condenser lens 15 onto the photodetector 16 which will detect the return light. The photodetector 16 makes a photoelectric conversion of the thus detected return light to a current and then the current to a voltage, to thereby generate a voltage signal corresponding to the return light. The voltage signal generated by the photodetector 16 is supplied to the RF amplifier 25.

The RF amplifier 25 generates a wobble signal according to the voltage signal supplied from the photodetector 16, and supplies it to the ATIP decoder 27. The ATIP decoder 27 demodulates the wobble signal under the control of the controller 4 to generate an ATIP wobble signal indicative of time-base data. The ATIP wobble signal is supplied to the controller 4.

The controller 4 judges, based on the pattern of a sync signal "SYNC" in the ATIP wobble signal supplied from the ATIP decoder 27, the CD-RW 100 set on the spindle motor 2 to be a normal-density or double-density CD-RW. When the controller 4 has judged the CD-RW 100 set on the spindle motor 2 to be a normal-density CD-RW, it will read various corresponding controlling conditions from the EEPROM 7 and set an operation parameter for each of the components of the optical disc drive 1 under the controlling conditions. On the other hand, when the controller 4 has judged the CD-RW 100 set on the spindle motor 2 to be a double-density CD-RW, it will read corresponding controlling conditions from the EEPROM 7 and set an operation parameter for each component of the optical disc drive 1 under the controlling conditions.

Also, when the controller 4 has judged the CD-RW 100 set on the spindle motor 2 to be a normal-density CD-RW, it will control the spindle driver 3 to drive the spindle motor 2 so that the normal-density CD-RW on the spindle motor 2 will rotate at a CLV of about 1.2 m/sec (standard velocity). On the other hand, when the controller 4 has judged the CD-RW 100 set on the spindle motor 2 to be a double-density CD-RW, it will control the spindle driver 3 to drive the spindle motor 2 so that the double-density CD-RW on the spindle motor 2 will rotate at a CLV of about 0.9 m/sec (standard velocity).

With the above series of operations, the optical disc drive 1 will get "ready" for data write to the CD-RW 100.

When the optical disc drive 1 is in the "ready" state, it will be supplied with a recording instruction and data to be written to the CD-RW 100 (will be referred to as "recording data" hereunder) from the computer or the like at the host side. The recording instruction supplied from the computer or the like at the host side will further be supplied to the controller 4 via the interface unit 29 while the recording data will be supplied to the data processor 28 via the interface unit 29.

Supplied with the recording instruction, the controller 4 will control the operation of the access mechanism 24 to move the optical pickup 10 radially of the CD-RW 100 set on the spindle motor 2 and thus allow the optical pickup 10 to access a desired recording track on the CD-RW 100.

Also, supplied with the recording data, the data processor 28 will encode the recording data to a predetermined sector format, then append an error correction ECC to the sector format recording data and make CIRC encoding and EFM modulation of the data, to thereby generate a recording signal. The recording signal is supplied to the laser driver 21.

The laser driver 21 drives the semiconductor laser 11 of the optical pickup 10 according the recording signal supplied from the data processor 28 under the control of the controller 4. Thus, the semiconductor laser 11 will emit a light beam modulated according to the recording data and having a writing power (will be referred to as "writing light beam" hereunder). Since the writing power as a parameter set at the laser driver 21 is an optimum writing power for the CD-RW 100, having been read from the EEPROM 7 at the aforementioned set-up stage, so the semiconductor 11 will emit a recording light beam having an optimum writing power for the CD-RW 100.

The writing light beam emitted from the semiconductor laser 11 is changed by the collimator lens 12 to a parallel beam, the parallel beam is passed through the beam splitter 13 and focused by the objective lens 14 onto the CD-RW 100 being rotated on the spindle motor 2. At this time, since the writing light beam has been modulated according to the recording data, a row of pits corresponding to the recording data will be formed on the CD-RW 100, and thus data will be written to the CD-RW 100.

Next, the data read from the CD-RW 100 by the optical disc drive 1 according to the present invention will be described herebelow. For reading data from the CD-RW 100, the optical disc drive 1 is first put into the "ready" state for data read by effecting the same operations as in the data write to the CD-RW 100.

Then, when the optical disc drive 1 is "ready", it will be supplied with a playback instruction from the computer or the like at the host side. The playback instruction is further supplied to the controller 4 via the interface unit 29.

Supplied with the playback instruction, the controller 4 controls the access mechanism 24 to move the optical pickup 10 radially of the CD-RW 100 set on the spindle motor 2 and allows the optical pickup 10 to access a desired recording track on the CD-RW 100.

Also, supplied with the playback instruction, the controller 4 will control the operation of the laser driver 21 to drive the semiconductor laser 11 of the optical disc drive 10 and thus allow the semiconductor laser 11 to emit a light beam having a reading power (will be referred to as "reading light beam" hereunder). Since the reading power set as a parameter at the laser driver 21 is an optimum reading power for the CD-RW 100, having been read from the EEPROM 7 at the aforementioned set-up stage, so the semiconductor 11 will emit a reading light beam having an optimum reading power for the CD-RW 100.

The reading light beam emitted from the semiconductor laser 11 is changed by the collimator lens 12 to a parallel beam, the parallel beam is passed through the beam splitter 13 and converged by the objective lens 14. The reading light beam converged by the objective lens 14 is thus incident upon the CD-RW 100 being rotated on the spindle motor 2 to define a light spot along the row of pits formed on the CD-RW 100.

The reading light beam incident upon the CD-RW 100 will be reflected by the latter. At this time, the reflectance of the reading light beam will vary depending upon the status (pit presence or absence and pit length) of a row of pits along which the light spot is defined. Namely, since the difference in reflectance reflects data recorded in the CD-RW 100, so the return light from the CD-RW 100 will contain signal components.

The return light containing the signal components is passed through the objective lens 14, reflected by the beam splitter 13, converged by the condenser lens 15 and then incident upon the photodetector 16 which will detect the return light. The photodetector 16 makes a photoelectric conversion of the return light to a current and converts the current to a voltage, thereby generating a voltage signal corresponding to the return light. The voltage signal thus generated by the photodetector 16 is supplied to the RF amplifier 25.

The RF amplifier 25 generates a reading signal (RF signal), focus error signal, tracking error signal, wobble signal, etc. according to the voltage signal supplied from the photodetector 16.

The focus error signal and tracking error signal generated by the RF amplifier 25 are supplied to the servo controller 22. The servo controller 22 drives the bi-axial driver 23 according to the focus and tracking error signals under the control of the controller 4 to make focus and tracking servo control of the optical pickup 10. At this time, the servo controller 22 can assure a proper focus and servo control of the optical pickup 10 since at the aforementioned start-up stage optimum offset and gain values of focus and tracking servo control for the CD-RW 100 have been read from the EEPROM 7 and set as parameters.

Also, the wobble signal generated by the RF amplifier 25 is supplied to the ATIP decoder 27. The ATIP decoder 27 demodulates the wobble signal under the control of the controller 4 to generate an ATIP wobble signal indicative of time-base data. The ATIP wobble signal is supplied to the controller 4. The controller 4 will control the access mechanism 24 according to the ATIP wobble signal.

Also, the reading signal generated by the RF amplifier 25 is supplied to the binarization/clock generation unit 26 in which it will be binarized to provide a digital data. The digital data is supplied to the data processor 28.

In the data processor 28, the supplied digital data is subjected to EFM demodulation, de-interleaving and CIRC error correction. Further, the digital data thus processed is subjected to descrambling and ECC error correction, and stored in the buffer memory such as RAM. Thereafter, the digital data thus processed is supplied as reading data to the computer or the like at the host side via the interface unit 29. Thus, data will be read from the CD-RW 100.

Next, erasure of data recorded in the CD-RW 100 by the optical disc drive 1 according to the present invention will be described herebelow. For erasing data recorded in the CD-RW 100, the optical disc drive 1 is first put into the "ready" state for data erasure by effecting the same operations as in the data write to, and data read from, the CD-RW 100.

Then, when the optical disc drive 1 is "ready", it will be supplied with an erasure instruction from the computer or the like at the host side. The erasure instruction is further supplied to the controller 4 via the interface unit 29.

Supplied with the erasure instruction, the controller 4 controls the access mechanism 24 to move the optical pickup 10 radially of the CD-RW 100 set on the spindle motor 2 and allows the optical pickup 10 to access a desired recording track on the CD-RW 100.

Also, supplied with the erasure instruction, the controller 4 will control the operation of the laser driver 21 to drive the semiconductor laser 11 of the optical disc drive 10 and thus allow the semiconductor laser 11 to emit a light beam having an erasing power (will be referred to as "erasing light beam" hereunder). Since the erasing power set as a parameter at the laser driver 21 is an optimum erasing power for the CD-RW 100, having been read from the EEPROM 7 at the aforementioned set-up stage, so the semiconductor 11 will emit an erasing light beam having an optimum reading power for the CD-RW 100.

The erasing light beam emitted from the semiconductor laser 11 is changed by the collimator lens 12 to a parallel beam, the parallel beam is passed through the beam splitter 13 and converged by the objective lens 14. The erasing light beam converged by the objective lens 14 is thus incident upon the CD-RW 100 being rotated on the spindle motor 2 to erase data recorded in the CD-RW100.

As having been described in the foregoing, in the optical disc drive 1 according to the present invention, when data is written to, read from or erased from the CD-RW 100, the controller 4 instantly judges the CD-RW 100 to be a normal-density or double-density CD-RW, reads corresponding controlling conditions from the EEPROM 7, sets an operation parameter for each component of the optical disc drive 1 and puts the latter into the "ready" state. Thus, the optical disc drive 1 can quickly be started up and data write, read or erasure can properly be done with respect to both the normal-density CD-RW and double-density CD-RW.

In the aforementioned optical disc drive 1, the type of the CD-RW 100 (normal-density or double-density CD-RW) is discriminated based on the pattern of the sync signal "SYNC" included in the ATIP wobble signal. However, the disc type discrimination is not limited to this method but the disc type may be discriminated based on a difference of a frame sync signal of detected data or a difference of a signal included in a subcode.

Also, in the aforementioned optical disc drive 1, the EEPROM 7 is provided to store various controlling conditions requisite for data write and read. However, the controlling condition storing means is not limited to the EEPROM 7 but any storing means which could store data may be used for this purpose. By using a rewritable storing means such as the EEPROM 7, however, controlling conditions stored in the storing means can be fine-adjusted at the stage of optical disc drive manufacture. So, if the optimum controlling condition varies slightly from one optical disc drive to another, such a rewritable storing means should desirably be used.

As having been described in the foregoing, the optical disc drive according to the present invention can be put into the "ready" state very quickly for data write or read and can properly write and/or read data to and/or from each of a plurality of types of optical discs different in recording density from each other.

What is claimed is:

1. An optical disc drive compatible with a plurality of types of optical discs different in recording density from each other, the apparatus comprising:
   means for writing and/or reading data to and/or from each of the plurality of types of optical discs;
   means for storing, for each of the plurality of types of optical discs, controlling conditions under which the data writing/reading means writes and/or reads data to and/or from each of the plurality of types of optical discs; and
   a disc discriminating means for determining the recording density of an optical disc to and/or from which the data writing/reading means is going to write and/or read data;
   the data writing/reading means acquiring, from the storing means, controlling conditions corresponding to the recording density of the optical disc, determined by the disc discriminating means, and writing and/or reading data to and/or from the optical disc under the acquired controlling conditions.

2. The apparatus as set forth in claim 1, wherein the storing means has stored therein set values of light emitting power for the plurality of types of optical discs as data write and/or read controlling conditions under which the data writing/reading means writes and/or reads data to and/or from the optical disc.

3. The apparatus as set forth in claim 2, wherein the data writing/reading means selects a data writing and/or reading laser power output for each of the plurality of types of optical discs under the controlling conditions stored in the storing means.

4. The apparatus as set forth in claim 1, wherein the optical disc has formed thereon grooves wobbled correspondingly to predetermined data;
   the disc discriminating means determines, based on a sync pattern obtained by reading the wobble data from the grooves, the type of an optical disc to and/or from which the data writing/reading means is going to write and/or read data.

5. The apparatus as set forth in claim 4, wherein the predetermined data includes positional data.

6. The apparatus as set forth in claim 1, wherein the data writing/reading means includes an optical pickup which emits a light beam towards the optical disc and detects a reflected light from the optical disc.

7. The apparatus as set forth in claim 1, wherein the storing means is a rewritable memory.

8. The apparatus as set forth in claim 1, wherein the storing means is an EEPROM.

9. The apparatus as set forth in claim 1, wherein the storing means has stored therein focus and/or tracking servo controlling conditions for each of the plurality of types of optical discs as controlling conditions under which the data writing/reading means writes and/or read data to the plurality of types of optical discs.

10. The apparatus as set forth in claim 9, wherein the data writing/reading means selects focus and/or tracking servo controlling conditions for each of the plurality of types of optical discs under the controlling conditions stored in the storing means.

11. An optical disc drive compatible with a plurality of types of optical discs different in recording density from each other, the apparatus comprising:
    a recording/playback unit including an optical pickup to emit a light beam towards the optical disc and detect a reflected light from the optical disc, and which writes and/or reads data to and/or from each of the plurality of types of optical discs;
    a motor which drives to rotate each of the plurality of types of optical discs;
    a memory having stored therein, for each of the plurality of types of optical discs, controlling conditions under which the recording/playback unit writes and/or reads data to and/or from each of the plurality of types of optical discs; and
    a disc discriminator which determines the type of an optical disc to and/or from which the recording/playback unit is going to write and/or read data;
    the recording/playback unit acquiring, from the memory, controlling conditions corresponding to the type of the optical disc, determined by the disc discriminator, and writing and/or reading data to and/or from the optical disc under the acquired controlling conditions.

12. The apparatus as set forth in claim 11, wherein the memory has stored therein set values of light emitting power for the plurality of types of optical discs as controlling conditions under which the recorder/playback unit writes and/or reads data to and/or from each of the plurality of types of optical discs.

13. The apparatus as set forth in claim 12, wherein the recording/playback unit selects a laser power output for data write and/or read for each of the plurality of types of optical discs under the controlling conditions stored in the memory.

14. The apparatus as set forth in claim 11, wherein the optical disc has formed thereon grooves wobbled correspondingly to predetermined data;
    the disc discriminator determines, based on a sync pattern obtained by reading the wobble data from the grooves, the type of an optical disc to and/or from which the recording/playback unit is going to write and/or read data.

15. The apparatus as set forth in claim 11, wherein the memory is a rewritable memory.

16. The apparatus as set forth in claim 11, wherein the memory is an EEPROM.

17. The apparatus as set forth in claim 11, wherein the memory has stored therein focus and/or tracking servo controlling conditions for each of the plurality of types of optical discs as controlling conditions under which the recording/playback unit writes and/or read data to the plurality of types of optical discs.

18. The apparatus as set forth in claim 17, wherein the recording/playback unit selects focus and/or tracking servo controlling conditions for each of the plurality of types of optical discs under the controlling conditions stored in the memory.

19. A data recording/reproducing method enabling a plurality of types of optical discs different in recording density from each other, the method comprising steps of:

emitting a light beam towards the optical disc and detecting a reflected light from the optical disc;

determining the type of the optical disc based on the result of the reflected light detection; and selecting data write and/or read controlling conditions stored in a memory for each of the plurality of types of optical discs based on the result of the disc type discrimination; and writing and/or reading data to and/from the optical disc under the selected controlling conditions.

20. The method as set forth in claim 19, wherein set values of the light emitting power to be used for data write and/or read are stored as controlling conditions.

21. The method as set forth in claim 19, wherein the optical disc has formed thereon grooves wobbled correspondingly to predetermined data;

the type of the optical disc to and/or from which data is going to be written and/or read is determined based on a sync pattern obtained by reading the wobble data from the grooves,.

* * * * *